United States Patent
Marius et al.

(10) Patent No.: US 10,637,333 B1
(45) Date of Patent: Apr. 28, 2020

(54) NON-INVASIVE RUBBING DETECTION FOR MOTORS

(71) Applicant: Wisk Aero LLC, Mountain View, CA (US)

(72) Inventors: Diederik Marius, Mountain View, CA (US); Laura Weeks Shane, Palo Alto, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/013,077

(22) Filed: Jun. 20, 2018

(51) Int. Cl.
*G01R 31/02* (2006.01)
*H02K 11/26* (2016.01)
*H02K 11/27* (2016.01)

(52) U.S. Cl.
CPC ............. *H02K 11/26* (2016.01); *H02K 11/27* (2016.01)

(58) Field of Classification Search
CPC .................................. H01H 1/50; H02K 3/30
See application file for complete search history.

(56) References Cited

U.S. PATENT DOCUMENTS

| 2007/0057583 A1* | 3/2007 | Young | H02K 11/20 310/68 C |
| 2011/0147043 A1* | 6/2011 | Perry | H02K 3/30 174/119 C |
| 2017/0273239 A1* | 9/2017 | Ota | A01D 34/68 |

* cited by examiner

*Primary Examiner* — Karen Masih
(74) *Attorney, Agent, or Firm* — Kilpatrick Townsend & Stockton LLP

(57) ABSTRACT

Non-invasive rubbing detection for motors is disclosed. In an embodiment, a method of detecting rubbing on a stator of a motor includes providing an electrical conductor on the stator, (the electrical conductor has a first end and a second end). The method further includes determining that there is rubbing on a surface of the stator, including by probing the first end and the second end to determine whether there is an electrical connection across the electrical conductor, and determining that there is rubbing on the stator if there is no electrical connection. In an embodiment, the electrical conductor is disposed on the surface of the stator by etching away conductive foil to form the electrical conductor, and providing the electrical conductor.

22 Claims, 11 Drawing Sheets

100

300

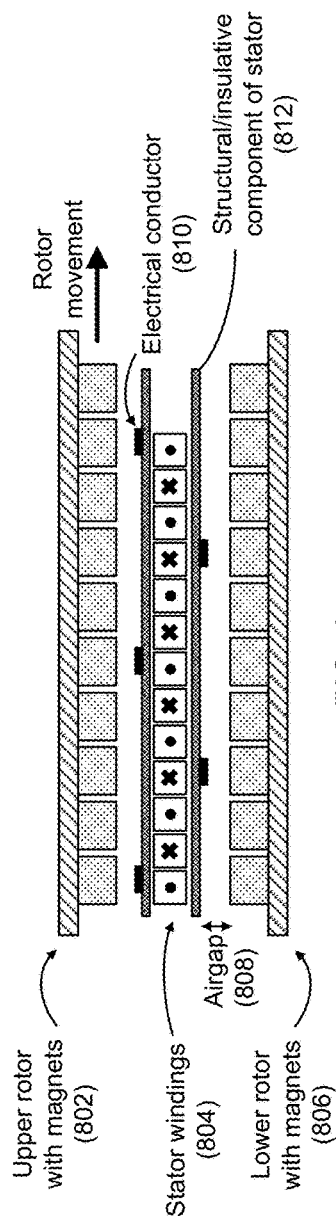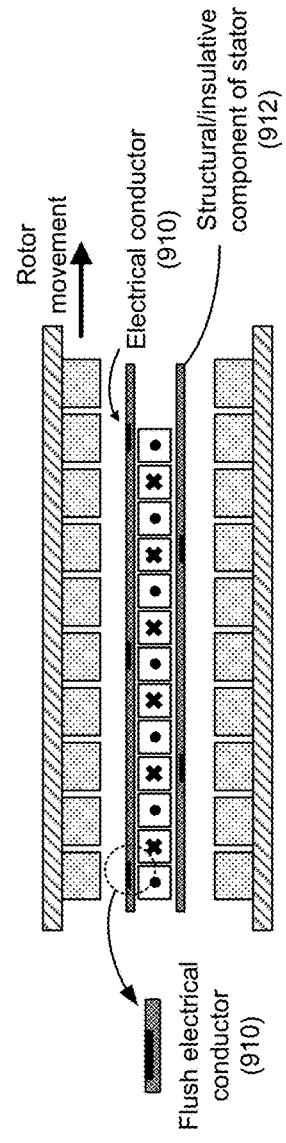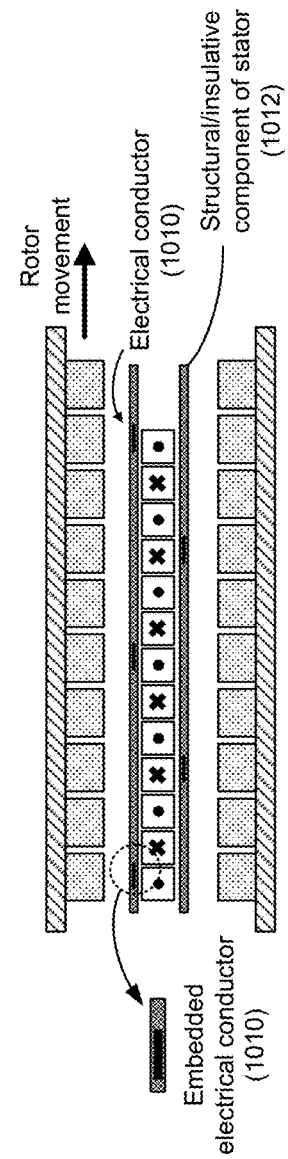
FIG. 8
FIG. 9
FIG. 10

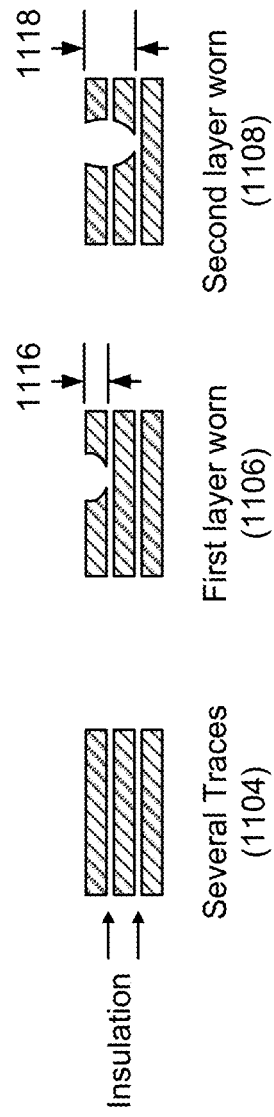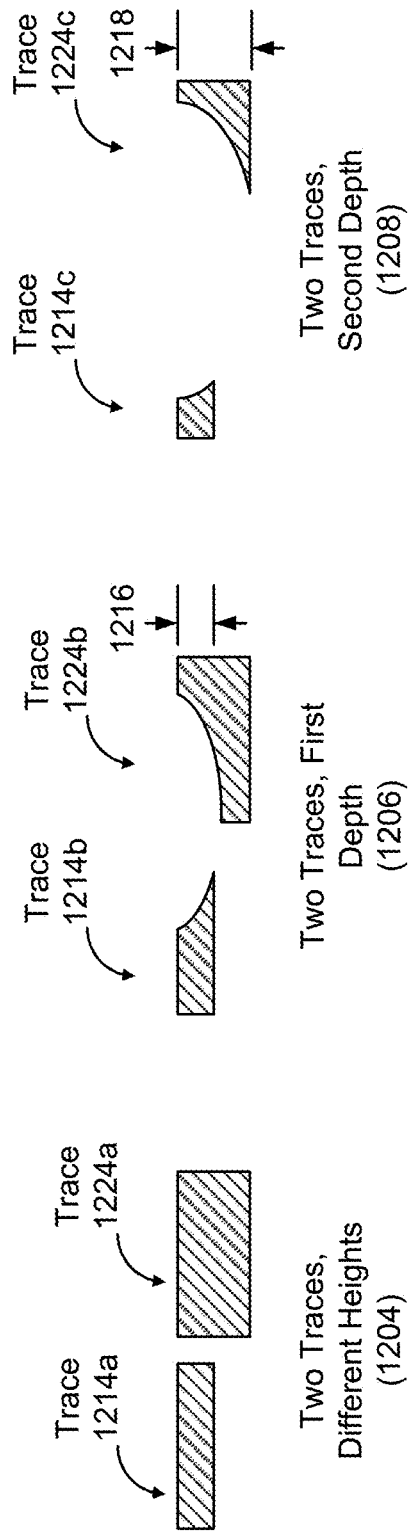

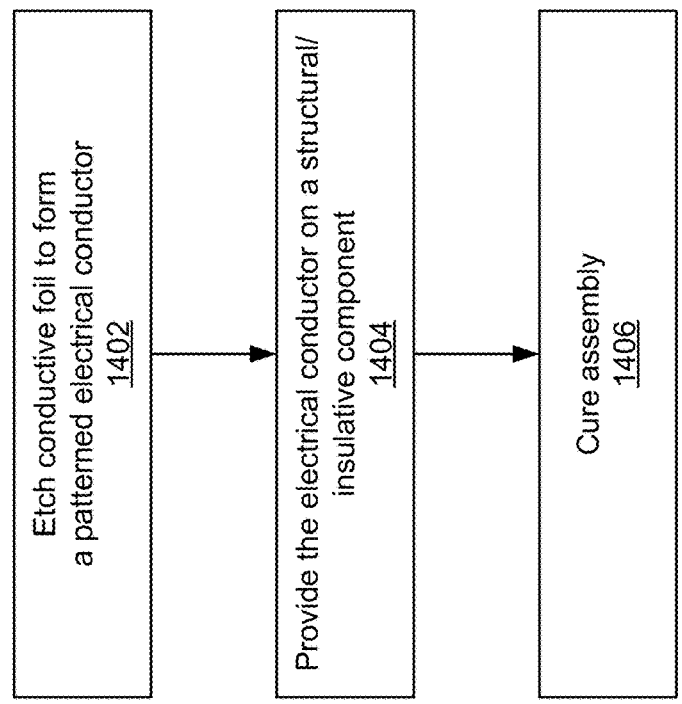
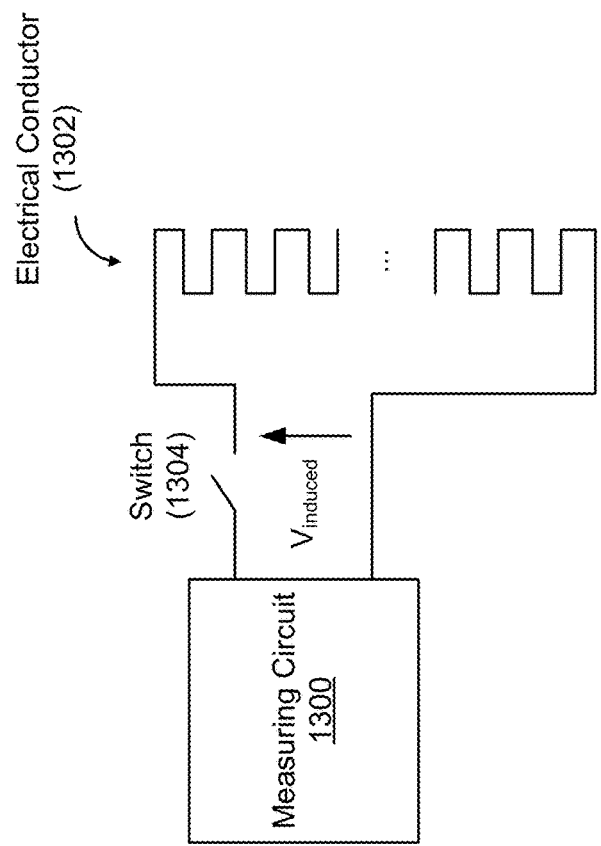

1520: Apply backing substrate to conductive foil
Backing substrate (1502)
Conductive foil (1504)
1530: Apply etching mask
Mask (1506)
1540: After etching and removing mask
Patterned electrical conductor (1508)
FIG. 15

1602: Cure the structural/insulative component

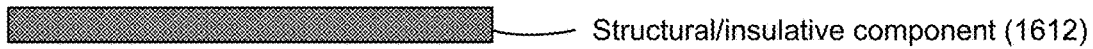
— Structural/insulative component (1612)

1604: Apply adhesive

— Adhesive

1606: Provide patterned electrical conductor

— Backing substrate (1502)
— Patterned electrical connector (1508)

1608: Remove backing substrate

1610: Cure assembly

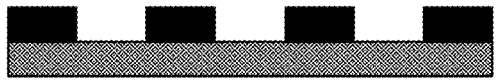

FIG. 16

1712: Provide patterned electrical conductor before final cure of structural/insulative component

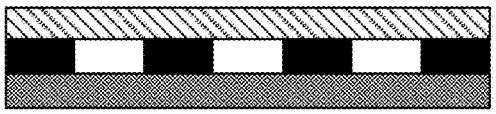

1714: Remove backing substrate

1716: Cure assembly with top mold surface touching the top of the electrical conductor

— Resin

FIG. 17

1822: Provide patterned electrical conductor before final cure of structural/insulative component
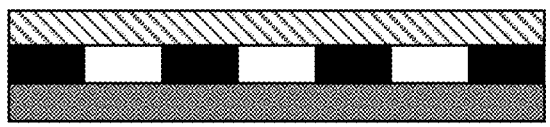
1824: Remove backing substrate
1826: Apply surface protector
 — Surface protector
1828: Cure assembly with top mold surface touching the top of the surface protector
FIG. 18

US 10,637,333 B1

NON-INVASIVE RUBBING DETECTION FOR MOTORS

BACKGROUND OF THE INVENTION

During operation of a motor, various motor components may flex or move, causing components to rub against each other. Prolonged rubbing may cut into motor parts, causing malfunction such as shorting. Malfunction can be prevented by detecting rubbing and intervening before parts become so worn out as to be non-functional. One cause of rubbing in motors is closing up of an airgap between a rotor and a stator during certain parts of operation such as high cross flow or when the motor is operated at high torque. For example, the motor may close up due to a shaft bending under loads, the stator vibrating, among other things. Another cause of rubbing is foreign object debris that originates in the motor or is inadvertently sucked into the motor such as into a primary cooling path or space between the rotor and stator. Conventional techniques for rubbing detection are invasive, typically requiring a motor to stop operation and be taken apart.

BRIEF DESCRIPTION OF THE DRAWINGS

Various embodiments of the invention are disclosed in the following detailed description and the accompanying drawings.

FIG. 8 is a block diagram illustrating an embodiment of electrical conductors provided on a surface of a stator to detect rubbing.

FIG. 9 is a block diagram illustrating an embodiment of electrical conductors provided flush with a surface of a stator to detect rubbing.

FIG. 10 is a block diagram illustrating an embodiment of electrical conductors embedded in a stator to detect rubbing.

FIG. 11 is a block diagram illustrating an embodiment of electrical conductors to detect a quantity of rubbing.

FIG. 12 is a block diagram of electrical conductors of different heights to detect a quantity of rubbing.

FIG. 13 is a block diagram of a measuring circuit to detect rubbing.

FIG. 14 is a flow chart illustrating an embodiment of a process for manufacturing a device to detect rubbing in motors.

FIG. 15 shows an example of a process to form a patterned electrical conductor.

FIG. 16 shows an example of a process to form an assembly in which an electrical conductor is disposed on the surface of a structural/insulative component.

FIG. 17 shows an example of a process to form an assembly in which an electrical conductor is flush with a surface of a structural/insulative component.

FIG. 18 shows an example of a process to form an assembly in which an electrical conductor is embedded in a structural/insulative component.

DETAILED DESCRIPTION

Figure 1:
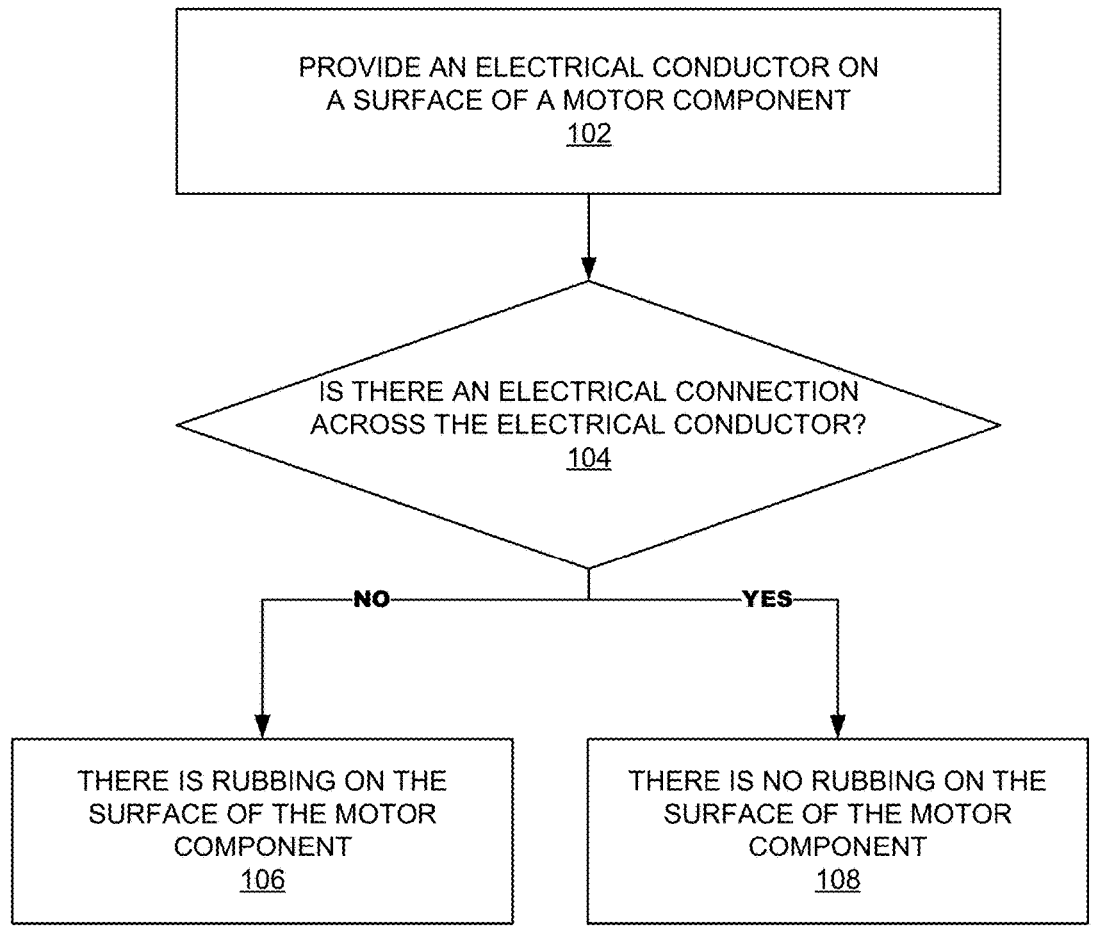
FIG. 1 is a flow chart illustrating an embodiment of a process of detecting rubbing in motors.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rubbing in motors causes machinery degradation and malfunction. Conventional rubbing detection techniques can be slow and typically require taking a motor apart. For example, a hipot/surge test may involve disconnecting a motor or taking apart a motor and detects rubbing only if the rubbing has been severe enough to cause damage to the stator windings. By contrast, in one aspect, the techniques described here detect rubbing in a non-invasive manner. This means that the motor does not need to be stopped and disassembled to detect rubbing. In another aspect, characteristics of the rubbing can be detected early on, allowing prophylactic measures to be taken. The techniques described here also provide ways to quantify a degree or amount of rubbing that has occurred. For example, although some stators are designed to have some tolerance for rubbing (allowing for rubbing to occur during small fractions of flight), after a certain amount of rubbing has occurred, the stator should be replaced to avoid exhaustion or malfunction. Knowing when that level of rubbing has occurred is helpful to decide when to replace parts.

Various embodiments of non-invasive rubbing detection techniques for motors are disclosed. The rubbing detection described can be performed (in various embodiments) as a pre-check or post-check or performed continuously during operation of a motor (one embodiment of which is more fully described with respect to FIG. 13). The rubbing detection techniques described here can be used to detect when rubbing begins or an amount of rubbing that has occurred. Unlike conventional rubbing detection, the techniques described here do not require a motor to be stopped or disassembled to detect rubbing. In an embodiment, a process of detecting rubbing on a stator includes providing an electrical conductor on a surface of a stator. The electrical connection has a first end and a second end. The process determines that there is rubbing on the surface of the stator, including by probing the first end and the second end to determine whether there is an electrical connection across the electrical conductor. The process determines that there is rubbing on the stator if there is no electrical connection.

FIG. 1 is a flow chart illustrating an embodiment of a process of detecting rubbing in motors. Process 100 can be performed using a measuring circuit such as the one shown in FIG. 13 to detect rubbing in a motor such as the one shown in FIGS. 2A and 2B.

The process begins by providing an electrical conductor on a surface of a motor component (102). The motor component can be a stator, a rotor, or some other component in a motor. The following examples chiefly describe the electrical conductor as being provided on a stator, but electrical conductor can instead (or in addition) be applied to other motor components such as a rotor. For example, the electrical conductor covers a distance on the stator to detect rubbing in a vicinity of the area covered by the electrical conductor. The electrical conductor is expected to have electrical connectivity until it gets worn away by rubbing. The electrical conductor can be placed manually, by a robot arm, or by a combination as more fully described below. The electrical conductor can be disposed on a surface by an adhesive. In some embodiments, the electrical conductor is integrated with the stator, for example flush with the stator or embedded in the stator by placing the electrical conductor then curing the electrical conductor and stator assembly for example by applying a surface protector as described with respect to FIG. 14.

Figure 5A:
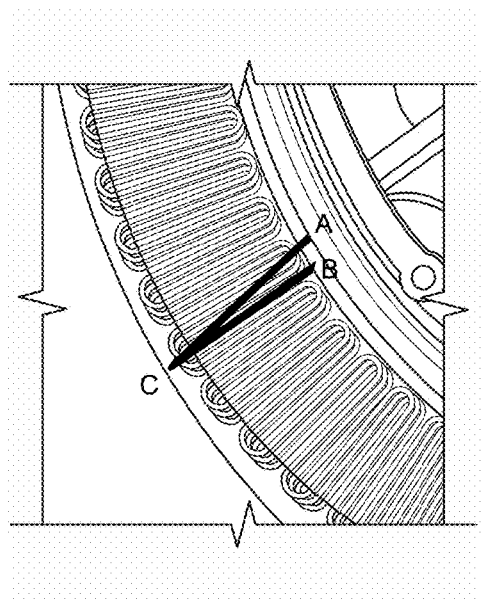
FIG. 5A is a block diagram illustrating an embodiment of an electrical conductor with electrical continuity.
Figure 5B:
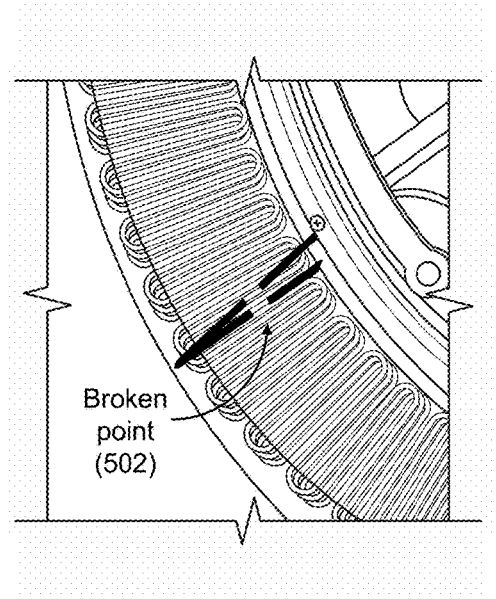
FIG. 5B is a block diagram illustrating an embodiment of an electrical conductor with electrical continuity.

The process determines whether there is an electrical connection across the electrical conductor (104). The material of the electrical conductor is conductive, so an electrical conductor undamaged by rubbing is expected to have an electrical connection. As the electrical conductor gets rubbed away over time, the electrical connection gets broken, and the measurement would result in no electrical connection being detected. An example of an unbroken electrical conductor is shown in FIG. 5A, and an example of a broken electrical conductor is shown in FIG. 5B.

The process determines that there is rubbing on the surface of the motor component (106) if there is no electrical connection across the electrical conductor. Rubbing causes an electrical connection to be broken because rubbing wears away the electrical conductor. When so much rubbing has occurred that the electrical conductor is broken, then no electrical connection is detected. An example of the effects of rubbing is more fully described with respect to FIGS. 5A and 5B. In some embodiments, a quantity or level of rubbing can be detected or otherwise measured by providing a plurality of electrical conductors or an electrical conductor having several layers as described with respect to FIGS. 11 and 12.

Otherwise, the process determines that there is no rubbing on the surface of the motor component (108) if there is an electrical connection across the electrical conductor. If a level of rubbing is so low that an electrical connection has not been broken, then an electrical connection will be detected and the process thus determines that no rubbing is occurring. In other words, the level of rubbing is not so severe as to degrade the stator.

One or more electrical conductors can be connected in series or parallel. In some embodiments, the electrical conductors are connected in parallel, allowing the exact location of the rubbing to be detected. In some embodiments, the electrical conductors are connected in series to detect rubbing in a general region when the exact location of the rubbing need not be known. Wiring the electrical conductors in series allows fewer electrical conductors to be used and reduces cost.

In some embodiments, rubbing detection can be performed in real time, e.g., when a motor is in operation, without interfering with the operation of the motor. To detect rubbing in real time, the electrical conductors are provided such that voltages generated by the electrical conductor cancel out. For example, when performing rubbing detection continuously, an electrical conductor is disposed on the surface of a stator (such as stator 302 of FIG. 3) such that the total induced voltage is zero when a rotor (such as rotors 300 or 304) associated with the stator is rotating.

Process 100 finds application in a variety of devices. The following figures show examples of assemblies (e.g., motors, lift fans) in which process 100 can be used to detect rubbing.

Figure 2A:
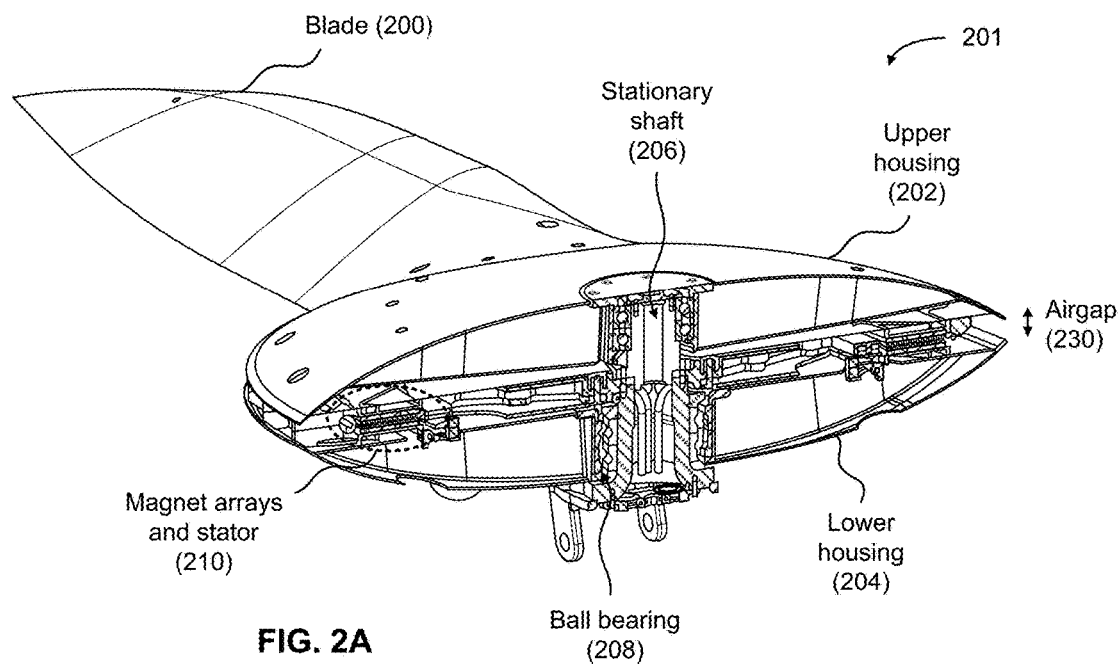
FIG. 2A is a block diagram illustrating an embodiment of a motor in which rubbing is detected according to some embodiments.

FIG. 2A is a block diagram illustrating an embodiment of a motor in which rubbing is detected according to some embodiments. More specifically, the cross-sectional view 201 shows a combined fan and motor. The techniques to detect rubbing described here can be applied to such a motor, even though the airgap 230 between the rotor and stator is small.

In view 201, a cross section of the exemplary combined fan and motor is shown with a blade (200) attached to an upper housing (202). The other half of the upper housing (which is not shown here) would have another blade attached to that part of the upper housing. In other words, the exemplary combined fan and motor has two blades. The upper housing (202) and lower housing (204) are connected together at various points, for example using screws or bolts.

A stationary shaft (206) sits in the middle of and is encased by the upper housing (202) and lower housing (204). The blade (200), upper housing (202), lower housing (204), and attached parts are able to rotate about the shaft (206) because of a plurality of ball bearings (208). In this example there are two layers of ball bearings for the upper housing and two layers of ball bearings for the lower housing, but naturally any number of layers and/or ball bearings may be used.

Figure 2B:
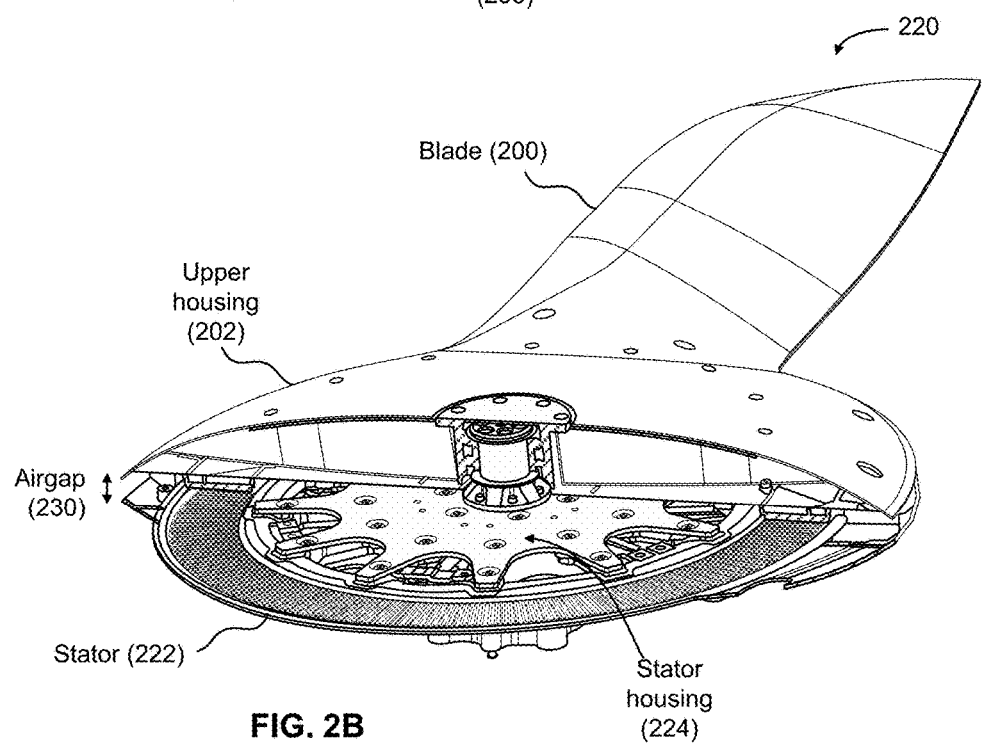
FIG. 2B is a block diagram illustrating an embodiment of a motor in which rubbing is detected according to some embodiments.

FIG. 2B is a block diagram illustrating an embodiment of a motor in which rubbing is detected according to some embodiments. The cross-sectional view 220 shows an alternate view with a better view of the stator (222) and the limited space 230 around it. The stator housing (224), which is also shown here, is used to hold the stator in place and/or connect the stator to the rest of the lift fan. It is noted that the magnet arrays and stator are sized so that they have a relatively large diameter (e.g., the magnet arrays and stator sit close to the outer edge of the upper and lower housing as opposed to closer to the center). In this example, the magnet arrays and stator have relatively large diameters because with this motor topology and/or for relatively slow rotations per minute direct drive applications like this, a motor with magnet arrays and a stator with larger diameters is better.

In this example, the motor includes two arrays of magnets and a stator (210) which uses magnetic forces (e.g., attraction and/or repulsion) to rotate the combined fan and motor. The space 230 surrounding the stator and magnet arrays 210 is shown in FIGS. 2A and 2B. This space between the rotor and stator is narrow and typically does not accommodate large measuring equipment. In addition, when the combined fan and motor is assembled, the upper housing 202 and lower housing 204 are securely closed. To access the airgap 230, conventional methods typically stop the motor and take apart the motor (e.g., removing screws). Since there is limited to no access to the airgap 230, rubbing detection conventionally involves a time consuming and labor intensive process of taking the motor apart, looking for signs of rubbing, rebuilding, and performing an acceptance test. The following figure shows the stator and two magnet arrays (210) in more detail. A magnet array may alternatively be referred to as an array of magnets (e.g., because the magnet array includes a plurality of magnets arranged around or as a circle).

Figure 3:
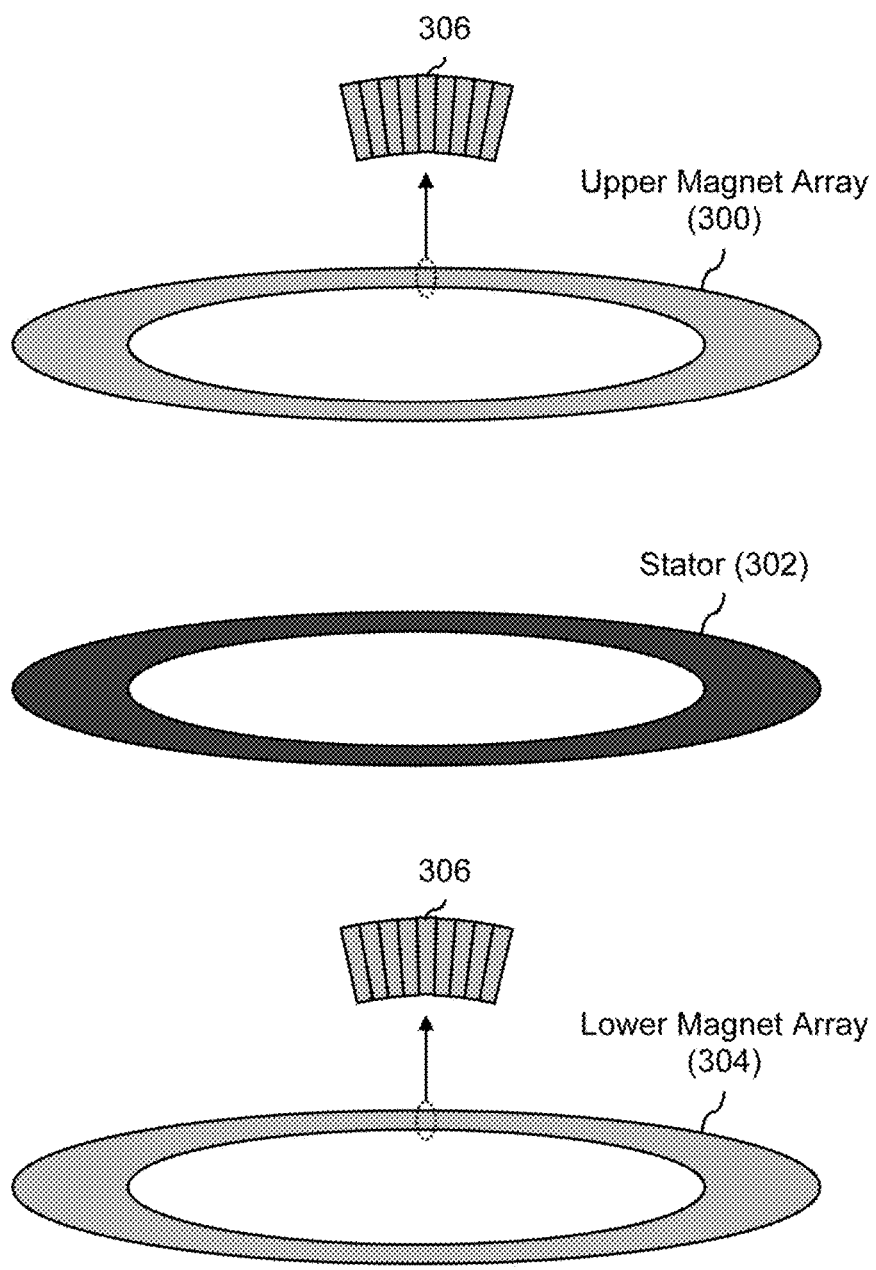
FIG. 3 illustrates an example of an upper magnet array, a lower magnet array, and an associated stator, in which rubbing is detected according to some embodiments.

FIG. 3 illustrates an example of an upper magnet array, a lower magnet array, and an associated stator, in which rubbing is detected according to some embodiments. For example, rubbing of stator 302 can be detected according to process 100 of FIG. 1. System 300 includes upper magnet array 300, stator 302, and lower magnet array 304. System 300 can be part of a motor assembly such as the ones shown in FIGS. 2A and 2B. The two magnet arrays and stator 210 from FIG. 2A are shown in more detail in FIG. 3. FIG. 3 is an exploded view to help clearly illustrate the stator and rotors (e.g., magnet arrays).

In this example, the upper magnet array (300) and lower magnet array (304) are full and flat circular arrays of magnets and are part of a brushless motor (at least in this example). For example, as the close-up views (306) show, each array is made up of a plurality of magnets. Individual magnets may be of various shapes. In some embodiments, a magnet is substantially a sector of a right cylindrical annulus, where a first surface is an upper surface having a shape that is substantially circular or trapezoidal and a second surface and third surface (e.g., substantially opposite each other and adjacent to the top surface) are flat rectangular or noncircular surfaces. In some embodiments, a magnet is substantially a right trapezoidal prism. In some embodiments, the upper magnet array (300) has substantially all of its magnetic field facing downwards and the lower magnet array (304) has substantially all of its magnetic field facing upwards.

The stator (302) in this example is a circular array which is "sandwiched" between the upper magnet array and the lower magnet array when the stator and the two magnet arrays are in their regular positions. In one example, there is an air gap of around 1.2 mm between the stator and each magnet array (e.g., 1.2 mm above the stator and below the stator). In some embodiments, the stator includes wire winding (not shown) mounted to the stator housing. For example, the stator may include a three phase litz wire winding mounted to the stator housing. Rubbing or damage created by foreign object debris could eat its way through insulation on top of the windings of the stator 302 and create a high voltage short, which results in operational loss of that motor and could cause damage on an aircraft system level. For example, rubbing may cause a high voltage phase to phase short, a high voltage phase to chassis short, and the like.

Stator (302) produces a varying magnetic field which (at various times) attracts or repels the upper magnet array and the lower magnet array. The stator (302) in this example is coupled or otherwise connected to a stationary shaft (e.g., 206 in FIG. 2A) such that the stator is also stationary. The upper magnet array (300) is coupled to a (e.g., rotatable) upper housing (e.g., 202 in FIG. 2A), where the upper housing rotates in response to the upper magnet array responding magnetically to the magnetic field output by the stator. That is, the upper magnet array will be magnetically attracted to (or magnetically repelled by) the magnetic field output by the stator and the coupled upper magnet array and upper housing will want to move closer (or move away). Since they are able to rotate, this movement corresponds to the coupled upper magnet array and upper housing rotating about the stationary shaft.

Similarly, the (e.g., rotatable) lower magnet array (304) is coupled to a rotatable lower housing (e.g., 204 in FIG. 2A) and the coupled lower magnet array and lower housing rotate in response to the magnetic field output by the stator. Therefore, by adjusting the magnetic field which is output by the stator, the upper housing, lower housing, and attached blades rotate (e.g., due to magnetic forces) while the shaft and connected stator remain stationary. In other words, the rotation of the combined fan and motor is controlled by the (varying) magnetic field produced by the stator.

Some electric motors which translate electrical energy (e.g., from a battery) into mechanical energy (e.g., the rotation of the lift fan) do so using mechanical means, such as belts, or gears. A lift fan which uses magnet arrays and stators may be lighter and for some applications (e.g., battery powered aircraft), the lighter weight may be an attractive choice. Although the use of magnets to rotate a lift fan may add more weight than gears or belts, gears and belts add complexity and reduce reliability. For these reasons, in this example (where reliability is desirable because it is an aircraft application) magnet arrays are used to rotate the lift fan.

The arrangement of magnets shown here is referred to as an axial flux motor. An alternate arrangement of the stator and magnet arrays would be to place them on the curved surface where the stationary shaft and two housings interface (e.g., near the ball bearings (208) in FIG. 2A); this is referred to as a radial flux motor. Although chiefly described using the example of a double-sided axial flux motor, the techniques described here also find application in other types of motors including radial flux motors and single-sided axial flux motors.

Figure 4:
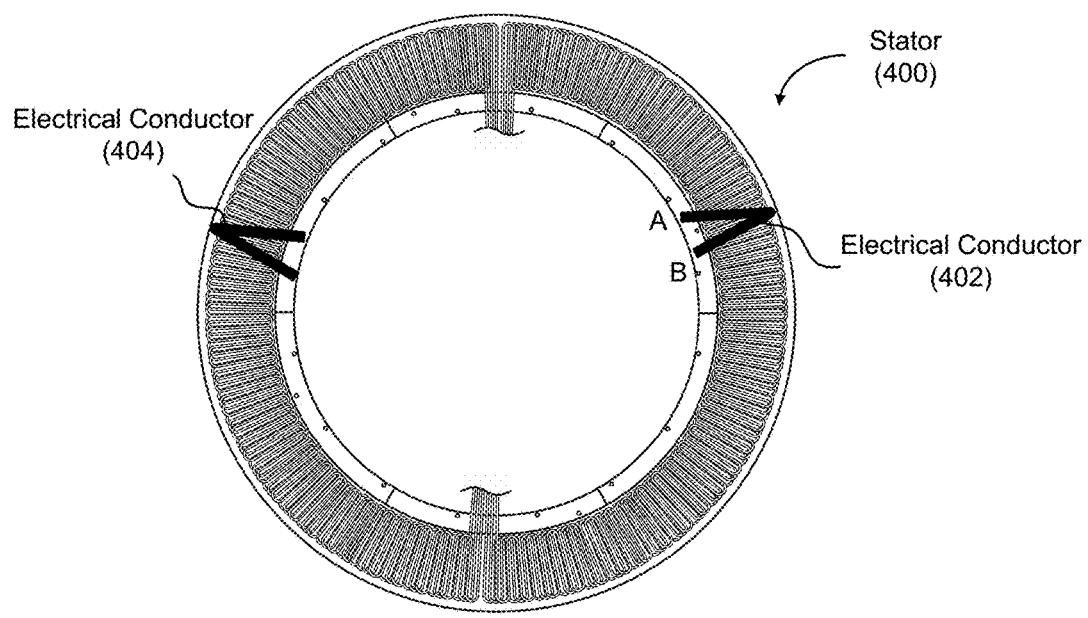
FIG. 4 is a block diagram illustrating an embodiment of an electrical conductor provided on a stator to detect rubbing.

FIG. 4 is a block diagram illustrating an embodiment of an electrical conductor provided on a stator to detect rubbing. The example stator 400 here is a flat annular aircore stator. The stator can be provided in an axial flux motor such as the one shown in FIGS. 2A and 2B. Two V-shaped electrical conductors 402, 404 are provided on the stator.

A measuring circuit can be used to perform the process of FIG. 1 on the electrical conductor to automatically detect rubbing without needing to take the motor apart. To determine whether there is rubbing, the electrical conductor is checked for continuity. For example, point A and point B are measured to determine whether there is electrical continuity across the electrical conductor 402. In this example, the points that are measured (point A and point B) are along an inner circumference of a stator. As FIG. 2A and FIG. 2B show, in this example there is more room for equipment and/or circuits to perform an electrical continuity check along the inner circumference of the stator as opposed to the outer circumference and therefore measuring points A and B are selected (at least for this embodiment). The measuring points can be provided elsewhere such as on the outer circumference, or, one measuring point is on the inner circumference and one point is on the outer circumference.

The electrical conductor can be made of any conducting material including, but not limited to, copper, aluminum, tin, and brass. The electrical conductor is sized based on the material used to minimize heating in the conductor. Heating is caused by eddy currents arising from alternating magnetic fields that penetrate these traces when a motor is spinning. The level of heating depends on flux density through the traces and the frequency of the magnetic field.

The number and placement of electrical conductors shown here is merely exemplary and not intended to be limiting. For example, a single electrical conductor or more than two electrical conductors can be used. In various embodiments, electrical conductors can be provided in several regions of the stator to measure rubbing in the associated regions. Here, a second electrical conductor 404 is provided in another region of the stator to allow rubbing to be detected in that area of the stator. For example, the second electrical conductor 404 is measured to determine whether there is an electrical connection across the second electrical conductor. If there is no electrical connection across the second electrical conductor, then rubbing has occurred in the second region. One or more electrical conductors can be placed throughout the entire stator, or, to conserve materials used, can be strategically placed in the regions expected to have more rubbing or to experience rubbing earlier than other regions.

The electrical conductor is sometimes called a "rubbing strip," because the conductor gets worn out over time if there is rubbing. Thus, if there is no electrical continuity, then rubbing has occurred because rubbing causes the electrical conductor to become worn and breaks the continuity in the conductor. Examples of various states of the electrical conductor are shown in the following figures.

FIG. 5A is a block diagram illustrating an embodiment of an electrical conductor with electrical continuity. This shows a state of the electrical conductor prior to rubbing severe enough to wear out the electrical conductor. As shown, the electrical conductor is V-shaped, with one prong of the conductor extending from a point on the inside circumference (A) of the stator to a point on the outside circumference (C) of the stator and another prong of the conductor extending from a point on the outside circumference (C) of the stator to a point on the inside circumference (B) of the stator. Here, the electrical conductor is intact and, when measured at point A and point B, will have electrical continuity.

FIG. 5B is a block diagram illustrating an embodiment of an electrical conductor with electrical continuity. The electrical conductor has been corrupted due to rubbing at point 502. When measured at point A and point B, no electrical continuity is detected. The shape, size, and placement of the electrical conductor shown in the preceding figures is merely exemplary and not intended to be limiting. Several electrical conductors may be connected in series or parallel to detect rubbing over a larger area. The following figures show other examples of electrical conductors that cover a larger area of a stator.

Figure 6:
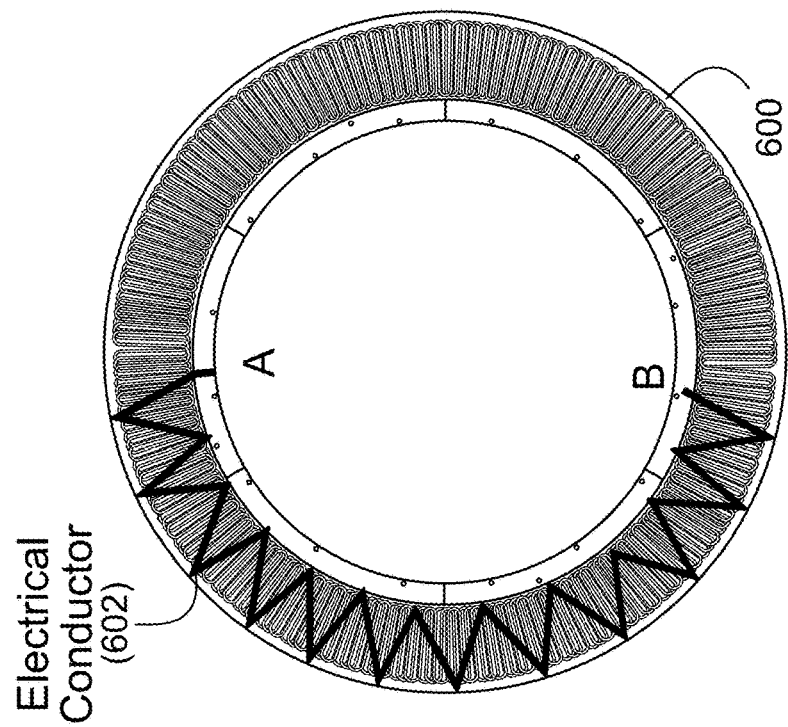
FIG. 6 is a block diagram illustrating an embodiment of a triangular electrical conductor provided on a stator to detect rubbing.

FIG. 6 is a block diagram illustrating an embodiment of a triangular electrical conductor provided on a stator to detect rubbing. The electrical conductor 602 in this example covers approximately half of one surface of the stator 600, allowing rubbing in that portion of the stator to be detected. Electrical conductor 602 is formed by connecting a series of V-shapes end to end to form a triangular path. One advantage of using a triangular path is that it is easier to ensure a net zero induced voltage. A net zero induced voltage is desirable when detecting rubbing in real-time. In one aspect, a non-zero induced voltage interferes with the normal operation of the motor in which the stator is provided. In some embodiments, the electrical conductor does not have a net zero induced voltage, and, when the motor is in operation (above 0 rpm), rubbing can be detected when 0V is measured. Here, points A and B may be measured to determine whether there is electrical continuity. Electrical continuity indicates that no rubbing or an acceptable level of rubbing has occurred, because the stator is still expected to be functional when the electrical conductor has not yet been worn away.

Figure 7:
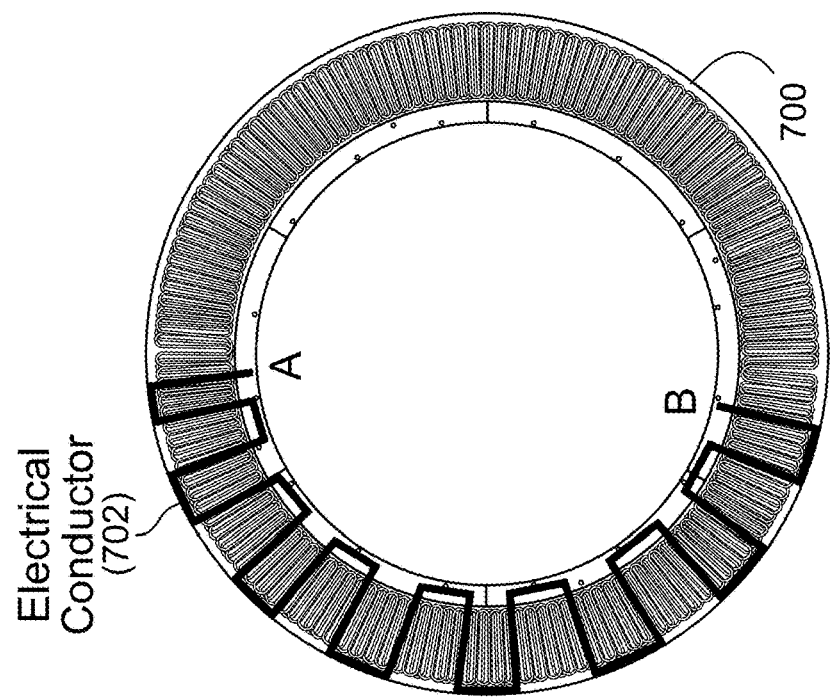
FIG. 7 is a block diagram illustrating an embodiment of a rectangular electrical conductor provided on a stator to detect rubbing.

FIG. 7 is a block diagram illustrating an embodiment of a rectangular electrical conductor provided on a stator to detect rubbing. The electrical conductor 702 in this example covers approximately half of one surface of the stator 700, allowing rubbing in that portion of the stator to be detected. Electrical conductor 702 is formed by connecting a series of rectangular shapes end to end to form a rectangular path with a series of parallel legs as shown. In various embodiments, the electrical conductor path is arranged such that the net induced voltage is zero, allowing rubbing to be detected in real time (when the motor is spinning) without interfering with normal operation of the motor. In a net zero induced voltage arrangement, the voltage in every section of the electrical conductor is canceled out by voltage induced by the rest of the electrical conductor. This also means that the conductor sees as much negative magnetic field as positive magnetic field. Here, points A and B may be measured to determine whether there is electrical continuity.

In FIGS. 6 and 7 above, the number and placement of crossings of the electrical conductor shown is merely exemplary and is not intended to be limiting. The number of crossings can be selected based on the desired precision of rubbing detection. For example, a large number of crossings allows the location of rubbing to be detected with greater accuracy. On the other hand, a small number of crossings allows material and cost to be conserved. Although not shown, the electrical conductor can be provided in other areas of the stator. For example, the conductor can be extended to cover the entire area of the stator to detect rubbing throughout the stator. In some embodiments, the top and bottom surfaces of the stator are evaluated in parallel, while in other embodiments, the top and bottom surfaces of the stator are evaluated separately. Whether to measure in parallel or in series can depend on cost (measuring separately tends to be higher), complexity (measuring separately tends to be more complex), the expected likelihood of one or the other to rub (measuring separately allows rubbing to be detected separately, giving a more precise location of rubbing), etc.

The preceding figures show a top-down view of the electrical conductor provided on the stator. The electrical conductor can be disposed on top of the stator, flush with the stator, or embedded in the stator as shown in the following figures.

FIG. 8 is a block diagram illustrating an embodiment of electrical conductors provided on a surface of a stator to detect rubbing. FIG. 8 shows a side view of an upper magnet array 802, a lower magnet array 806, and an associated stator 804 in which rubbing is detected. In this example, stator 804 is provided between an upper rotor 802 and a lower rotor 806. There is an airgap 808 between the stator and the upper and lower rotors to permit the rotors to spin relative to the stator.

As explained in more detail with respect to FIG. 3, each of the upper and lower rotors includes a plurality of magnets. For example, the magnet array can be a Halbach array having a relatively strong magnetic field on the top of the magnets and a relatively weak magnetic field on the bottom of the magnetics.

The stator 804 includes a plurality of windings. In this example, the "x" indicates windings going into the page and the dot indicates windings coming out of the page. In operation, the stator 804 produces a varying magnetic field that attracts or repels the upper rotor 802 and lower rotor 806 to cause the rotors to move in the direction of the arrow. In various embodiments, rubbing can be detected both when the motor is moving (the rotors are moving relative to the stator) and when the motor is still (the rotors are still). In various embodiments, the stator 804 includes a structural/insulative component 812 on which electrical conductors 810 are provided. The structural/insulative components can be made of a variety of materials such as cured fabric/resin.

One or more electrical conductors 810 are disposed on (e.g., above and below) the stator windings. In this example, three electrical conductors are provided on top of the stator and two electrical conductors are provided on the bottom of the stator. Here, the electrical conductors are attached to the surface of the stator. An example process of forming an electrical conductor on a stator is described with respect to FIG. 14.

The electrical conductors 810 are rubbed away over time, and when there is no longer electrical continuity, this indicates that the stator should be replaced or further examined. The example configuration of electrical conductors shown in which conductors are disposed on a surface of the stator has several advantages, and may be particularly suitable for testing situations. In one aspect, the electrical conductors are easily replaceable because when they are worn away, a new electrical conductor can be attached to the top surface of the stator without disassembling the stator. In another aspect, the electrical conductors allow rubbing up to the stator and not into the stator to be detected. This means that wear and tear can be detected earlier, before the structural integrity of the stator is impacted.

FIG. 9 is a block diagram illustrating an embodiment of electrical conductors provided flush with a surface of a stator to detect rubbing. FIG. 9 shows a side view of an upper magnet array, a lower magnet array, and an associated stator in which rubbing is detected. The assembly shown in FIG. 9 includes the same components as the assembly shown in FIG. 8 unless otherwise described here. Unlike the example of FIG. 8, the electrical conductors 910 are disposed flush with the structural/insulative components of the stator 912. A close examination of the electrical conductors 910 and the structural/insulative components 912 shows that there is no structural/insulative component 912 on the outward-facing surfaces of the electrical conductors 910, but there is some structural/insulative components 912 on the inward-facing surfaces.

This configuration of electrical conductors has several advantages, and may be particularly suitable for product operation situations when the motor is spinning. In one aspect, flush electrical conductors are less likely to be damaged because they do not protrude into mechanical airspace 808. When the assembly is being transported, the electrical conductors are less likely to be damaged, e.g., peeled off. In another aspect, when foreign object debris or flexing occurs, the electrical conductors are less likely to be worn out because the electrical conductors do not protrude into the mechanical airspace. The electrical conductors allow rubbing inside the stator (below a surface) to be detected.

FIG. 10 is a block diagram illustrating an embodiment of electrical conductors embedded in a stator to detect rubbing. FIG. 10 shows a side view of an upper magnet array, a lower magnet array, and an associated stator in which rubbing is detected. The assembly shown in FIG. 10 includes the same components as the assembly shown in FIG. 8 unless otherwise described here. Unlike the example of FIG. 8, the electrical conductors 1010 are embedded in the structural/insulative components of the stator 1012. A close examination of the electrical conductors 1010 and the structural/insulative components 1012 shows that there is a thin layer of structural/insulative components 1012 on the outward-facing surfaces of the electrical conductors 1010 as well as a thin layer of structural/insulative components 1012 on the inward-facing surfaces.

This configuration of electrical conductors has several advantages, and may be particularly suitable for product operation situations when the motor is spinning. For example, embedded electrical conductors are less likely to be damaged because they do not protrude into mechanical airspace 808. The electrical conductors allow rubbing inside the stator (below the surface) to be detected.

The magnet array and stator windings shown in FIGS. 8-10 are merely exemplary and are not intended to be limiting. For example, other types of magnet arrays (not Halbach arrays) may be used and the stator windings may be configured in other ways. The rubbing detection techniques described here find application in any arrangement of motor components that have sufficient space to accommodate the electrical conductor on top, flush, or embedded in the motor component.

The preceding figures show examples of electrical conductors that detect whether rubbing has occurred in a binary fashion (e.g., yes/no or pass/fail). In other embodiments, electrical conductors can be formed and disposed on a component to detect or otherwise measure a quantity of rubbing, e.g., how much or a level of rubbing that has occurred. The following figures show examples of detecting a quantity of rubbing using electrical conductors.

FIG. 11 is a block diagram illustrating an embodiment of electrical conductors to detect a quantity of rubbing. Three traces are layered on top of each other with (e.g., electrical) insulation between the traces. This allows the depth of rubbing to be detected. For example, an overall change in resistance is detected, indicating the depth of rubbing. For example, the three traces may be connected electrically at both ends (not shown) so that the resistance increases as each layer is worn away. Alternatively, each trace may be electrically independent of the other traces and an electrical continuity check is performed (e.g., independently) across each of the three traces. State 1104 shows the traces before any wearing of the traces has occurred. Three traces are arranged as shown, where each layer is electrically separated from the next layer. In this example, rubbing of the traces can be light rubbing (here, rubbing ⅓ of the way through), moderate rubbing (here, rubbing ⅔ of the way through), and full rubbing (here, rubbing all the way through).

State 1106 shows the traces after light rubbing has occurred. Specifically, the top layer is rubbed through. State 1108 shows the traces after moderate rubbing has occurred.

Specifically, the second layer is rubbed through. The difference in depth (depth 1116 in the first state and depth 1118 in the second state) can be detected because the overall change in resistance is different in state 1106 compared with state 1108 (e.g., the resistance increases because there are fewer channels or traces available to pass through from one end to the other). In various embodiments, the group of traces can be placed on the surface of a stator such as in FIG. 8, flush with the stator such as in FIG. 9, or embedded as in FIG. 10. The group of traces can replace the single electrical conductor shown in each of FIGS. 8-10. The number of traces shown here is merely exemplary and not intended to be limiting. For example, four or more levels can be used to detect a level of rubbing at a finer granularity and/or greater depth.

FIG. 12 is a block diagram of electrical conductors of different heights to detect a quantity of rubbing. At least two traces are provided in parallel. The traces vary in height as shown. Depending on wearing of the traces, the depth of rubbing can be determined. State 1204 shows the traces before any wearing of the tracing has occurred. Trace 1214a is disposed in parallel with trace 1224a as shown, where each layer is electrically separated from the adjacent layer. In this example, trace 1214a is expected to be completely rubbed away before trace 1224a is rubbed away because trace 1214a is shorter. When at least a portion of trace 1224a remains and the height of trace 1214a is rubbed through, this indicates light rubbing. When both trace 1214a and trace 1224a are rubbed through, this indicates full rubbing.

State 1206 shows the traces after light rubbing has occurred, specifically, trace 1214b is rubbed through, but trace 1224b is not completely rubbed through. Rubbing of depth 1216 is detected in this situation. State 1208 shows the traces after full rubbing has occurred, in which trace 1224c is also rubbed through (in addition to 1214c). Rubbing of depth 1218 is detected in this situation.

FIG. 13 is a block diagram of a measuring circuit to detect rubbing. The measuring circuit 1300 can be provided in a motor such as the one shown in FIG. 3 to detect rubbing. The measuring circuit can be configured to detect rubbing between flights, monitor rubbing continuously, or both. Measuring circuit 1300 is coupled to electrical conductor 1302. In this example, the electrical conductor is rectangular like the one shown in FIG. 7. In operation, measuring circuit 1300 applies a voltage and checks for current passing through the electrical conductor 1302. If current is detected, then the extent of rubbing has not been so great as to break the electrical conductor. Sometimes this is simply referred to as a binary result such as "no rubbing on the surface of the stator" (e.g., 108 of FIG. 1). In some embodiments, the amount of current detected indicates the quantity of rubbing that has occurred. For example, more current indicates that a lower level of rubbing has occurred compared with less detected current.

Measuring circuit 1300 can be configured to operate in different modes, allowing the same measuring circuit to be used both during flight and between flights. Whether monitoring is performed in real time or between flights may be determined based on the motor's function. Motors that work harder (e.g., used more frequently in an aircraft) may be monitored in real time while motors that work less hard may be monitored between flights. For example, forward propulsion motors (e.g., for wing-borne flight) can be monitored in real-time such as for 30 minutes at a time because they tend to be used more frequently and/or for longer periods of time during a typical flight. Lift fans (e.g., for vertical lift and propulsion) can be monitored between flights because they are used less frequently and/or for shorter periods of time. Monitoring lift fans between flights as opposed to during flight may be sufficient for lift fans because they are subject to less wear and tear as they are typically used for a few minutes in flight (takeoff and landing).

In various embodiments, rubbing monitoring is performed in real-time, e.g., during flight. The electrical continuity of the electrical conductor 1302 is checked continuously during operation. The electrical conductor is structured and placed such that the voltage induced by the spinning rotor in the electrical conductor is zero. For example, copper traces of the electrical conductor are placed such that the fields in every leg cancel each other out.

In various embodiments, rubbing monitoring is performed between flights. For example, a switch 1304 may be provided between measuring circuit 1300 and electrical conductor 1302. A pre- or post-flight check can be performed as follows. The switch is open during flight or spinning of the motor. The switch is closed to check the continuity of the electrical conductor 1302 during a pre- or post-flight check. The switch provides flexibility in arranging the electrical conductor. For example, the voltage induced by a spinning rotor in the electrical conductor can be non-zero because the switch is open while the rotor is spinning so that the operation of the motor is unaffected by the electrical conductor.

The following figures show examples of processes by which electrical conductors are formed and provided on a motor component to detect rubbing of that component.

FIG. 14 is a flow chart illustrating an embodiment of a process for manufacturing a device to detect rubbing in motors. The process can be implemented automatically such as by a robotic arm, manually, or in a combination to manufacture an electrical conductor like the ones described above in FIGS. 8-10. The process can be performed as part of other steps in the manufacture of motor components to provide an electrical conductor for detecting rubbing in a stator such as the one shown in FIG. 3.

The process begins by etching a conductive foil to form a patterned electrical conductor (1402). In various embodiments, prior to etching, the conductive foil is attached to a backing substrate using a weak adhesive. The conductive foil is patterned, for example, by applying a etching mask, to create an electrical conductor of a desired shape and dimension. Areas (channels) of the foil are etched away to form an electrical conductor of a desired shape or pattern. An example of a triangular path on a structural/insulative component of the stator is shown in FIG. 6. An example of a rectangular path on a structural/insulative component of the stator is shown in FIG. 7. An example of forming a patterned electrical conductor is shown in FIG. 15.

The process provides the electrical conductor on a structural/insulative component (1404). The structural/insulative component can be a motor part such as a stator. For example, the patterned electrical conductor obtained at 1402 is applied to the structural/insulative component and the backing substrate is removed.

The process then cures the assembly (1406). The assembly includes the electrical conductor and structural/insulative component. Depending on optional intermediate steps (more fully described below), at the end of curing, the electrical conductor is incorporated into the structural/insulative component. An example of a process to form an assembly in which an electrical conductor is disposed on a surface of the structural/insulative component is shown in FIG. 16. An example of a process to form an assembly in which an electrical conductor is flush with a surface of the structural/insulative component is shown in FIG. 17. An example of a process to form an assembly in which an electrical conductor is embedded in a surface of the structural/insulative component is shown in FIG. 18.

FIG. 15 shows an example of a process to form a patterned electrical conductor. At 1520, a backing substrate 1502 is applied to a conductive foil 1504. In some embodiments, registration holes are cut into the backing and used to locate the conductive traces to the stator. At 1530, an etching mask 1506 is applied. That is, the foil is masked with etching mask 1506. Then, the assembly is chemically etched to obtain an electrical conductor of a desired pattern. The mask 1506 covers the part of the conductive foil that should not be etched away, so that an electrical conductor of a desired shape and pattern remains after the etching step. At 1540, the mask is removed, and what is shown is an assembly with a patterned electrical conductor 1508. Electrical conductor 1508 corresponds to electrical conductor 810 of FIG. 8. The backing substrate can be helpful for transferring the resulting patterned electrical conductor to a structural/insulative component. For example, the backing substrate is useful for locating the correct location to place the electrical conductor. Once the electrical conductor is in place, the backing can be removed, as further described in the examples below.

The electrical conductor obtained as a result of the process shown in FIG. 15 can be applied to a structural/insulative component in a variety of ways. The following figures show example processes of forming assembling in which the electrical conductor is disposed on a surface of a stator (FIG. 16), flush with the surface of the stator (FIG. 17), or embedded in the stator (FIG. 18).

FIG. 16 shows an example of a process to form an assembly in which an electrical conductor is disposed on the surface of a structural/insulative component. At 1602, the structural/insulative component 1612 is cured. In this process, the structural/insulative component is cured before applying a patterned electrical conductor. At 1604, an adhesive is applied to the structural/insulative component. For example, a film adhesive of the same pattern as the patterned conductive foil is applied. At 1606, a patterned electrical conductor is applied to the structural/insulative component. The adhesive couples the electrical conductor to the structural/insulative component. The patterned electrical conductor can be fabricated by a process such as the one shown in FIG. 15. At 1608, the backing substrate is removed from the electrical conductor. The conductive foil material of the electrical conductor adheres to the material (e.g., a resin or pre-preg fiberglass) of the structural/insulative component, allowing the backing substrate to be peeled off. At 1610, the assembly including adhesive/conductive foil is cured. The resulting structure has an electrical conductor disposed on a surface rather than embedded in or flush with the surface.

FIG. 17 shows an example of a process to form an assembly in which an electrical conductor is flush with a surface of a structural/insulative component. At 1712, a patterned electrical conductor is applied to the structural/insulative component. The adhesive couples the electrical conductor to the structural/insulative component. The patterned electrical conductor can be fabricated by a process such as the one shown in FIG. 15. At 1714, the backing substrate is removed from the electrical conductor. At 1716, the assembly is cured with a top mold surface touching the top of the electrical conductor. During curing, resin fills the gaps in the conductive foil, leaving a smooth upper surface such that the foil traces (electrical conductors) are flush with the stator as shown in 910 of FIG. 9.

FIG. 18 shows an example of a process to form an assembly in which an electrical conductor is embedded in a structural/insulative component. At 1822, a patterned electrical conductor is provided on a structural/insulative component. Unlike FIG. 15, here, the patterned electrical conductor is provided before a final cure of the structural/insulative component. The patterned electrical conductor can be fabricated by a process such as the one shown in FIG. 15. At 1824, the backing substrate is removed from the electrical conductor. At 1826, a surface protector is applied. For example, the surface protector can be an adhesive or thin film material. The surface protector creates a gap between the electrical conductor and the mold used during the curing process. The surface protector is sized based on a desired gap between the top of the conductor and the top surface of the final stator assembly. For example, to obtain a more deeply embedded electrical conductor, a relatively thick layer of surface protector is applied. During a subsequent cure, the mold contacts the surface protector instead of the electrical conductor, causing the electrical conductors to be embedded in the resulting stator. At 1828, the assembly is cured in with a top mold surface touching the top of the surface protector. During curing, resin fills the gaps in the conductive foil. There is also a thin layer of resin or other material above the electrical conductor such that the electrical conductor is embedded in the structural/insulative component.

In some embodiments, the process shown in FIG. 18 can be altered to obtain embedded electrical conductors. For example, a curing step is performed between 1824 and 1826. Resulting in an assembly like the one shown at 1716 of FIG. 17. Then, a surface protector is applied, and the assembly is cured again to result in the assembly shown at 1828.

Although these examples show fabrication of an electrical conductor on one surface of the structural/insulative component, the techniques find application in other structures such as stators with rubbing strips on both sides. For example, prior to a final stator cure, the electrical conductor and backing substrate are transferred to both sides of the stator (e.g., top and bottom) as a last layer.

The techniques for detecting rubbing above find application in a variety of motors and have many advantages over conventional rubbing detection methods, which tend to be invasive and inefficient. For example, the rubbing detection disclosed here can be used to comply with regulations, set a time between motor overhauls, detect the presence of foreign object debris, indicate when parts should be replaced/risk of getting a motor short, and the like. The rubbing detection can be performed in a fraction of a second, e.g., as part of a pre/post flight inspection to check all the motors on the aircraft or during motor operation.

Although the examples above chiefly describe detection of rubbing in a stator, the techniques also apply to detecting rubbing in other motor components such as rotors. For example, the electrical conductors (sometimes called rubbing strips) can be disposed on a rotor (instead of or in addition to being disposed on a stator). One advantage of providing the electrical conductor on a rotor is that the conductor is not expected to see large flux density changes because the magnetic field is not moving relative to the electrical conductor. Among other applications, this may be suitable for rubbing detection between flights.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method of detecting rubbing on a motor component of a motor, the method comprising:
   providing an electrical conductor on the motor component, wherein the electrical conductor has a first end and a second end, the motor component includes a stator with windings provided between a pair of insulative components, and the electrical conductor is disposed on a surface of at least one of the pair of insulative components of the stator;
   probing the first end and the second end to determine whether there is an electrical connection across the electrical conductor;
   determining that there is no electrical connection across the electrical conductor based on the probing; and
   determining that there is rubbing on the motor component in response to a determining that there is no electrical connection.

2. The method of claim 1, wherein the electrical conductor is disposed on the surface of the stator such that a total induced voltage is zero when a rotor associated with the stator is rotating to perform rubbing determination continuously.

3. The method of claim 1, wherein the electrical conductor is at least one of: not magnetic, wire, and tape.

4. The method of claim 1, wherein the first end and the second end are provided in an interior circumference of the stator.

5. The method of claim 1, wherein the electrical conductor includes a plurality of layers of electrical conductors separated by one or more electrical insulators, wherein the method further comprises:
   quantifying an amount of rubbing including by:
   determining a quantity of rubbing based on broken ones of the plurality of layers of electrical conductors.

6. The method of claim 5, further comprising:
   quantifying an amount of rubbing including by:
   identifying, among the plurality of layers of electrical conductors, a specific layer of electrical conductor in which the rubbing occurred.

7. The method of claim 1, wherein the electrical conductor includes a first electrical conductor component and a second electrical conductor component, wherein the method further comprises:
   using the first electrical conductor component and the second electrical conductor component across a planar surface of the stator to detect a quantity of rubbing, the first electrical conductor component having a shorter height than the second electrical conductor component.

8. The method of claim 7, wherein:
   the first and second electrical conductor components are arranged such that they are aligned; and
   detection of the quantity of rubbing is based at least in part on which component is more worn out.

9. The method of claim 8, wherein the first and second electrical conductor components are arranged such that tops of the first and second electrical conductor components are aligned.

10. The method of claim 1, wherein the electrical conductor is a first electrical conductor disposed on a top surface of the stator, the method further comprising:
    providing a second electrical conductor on a bottom surface of the stator;
    probing a first end and a second end of the second electrical conductor to determine whether there is an electrical connection across the second electrical conductor; and
    determining that there is no electrical connection across the second electrical conductor based on probing; and
    determining that there is rubbing on the bottom surface of the stator in response to determining that there is no electrical connection across the second electrical conductor.

11. The method of claim 1, wherein the electrical conductor is a first electrical conductor disposed in a first region of the stator, the method further comprising:
    providing a second electrical conductor in a second region of the stator;
    probing a first end and a second end of the second electrical conductor to determine whether there is an electrical connection across the second electrical conductor;
    determining that there is no electrical connection across the second electrical conductor based on the probing; and
    determining that there is rubbing in the second region of the stator in response to determining that there is no electrical connection across the second electrical conductor.

12. The method of claim 1, wherein determining that there is rubbing on the surface of the motor component is performed in at least one of pre-check and end of flight.

13. The method of claim 1, wherein the electrical conductor is disposed on the motor component by:
    etching conductive foil to form the electrical conductor; and
    providing the electrical conductor on the surface of the motor component.

14. The method of claim 13, wherein the electrical conductor is disposed on the stator by curing the electrical conductor and the stator together.

15. The method of claim 14, further comprising, prior to curing the electrical conductor and the stator, applying a surface protector such that, after the cure, the electrical conductor is embedded in the stator.

16. The method of claim 13, further comprising, prior to the etching the conductive foil:
    attaching a backing substrate to the conductive foil;
    cutting registration holes into the backing substrate to locate conductive traces in the stator; and
    masking the conductive foil to pattern the electrical conductor.

17. The method of claim 1, wherein the motor includes a rotor, wherein another electrical conductor is provided on the rotor.

18. The method of claim 1, wherein the electrical conductor is at least one of: flush with the surface of the stator, and embedded inside the stator.

19. A system, comprising:
    a rubbing strip coupled to a motor component, wherein the rubbing strip includes an electrical conductor having a first end and a second end, the motor component includes a stator with windings provided between a pair of insulative components, and the electrical conductor is disposed on a surface of at least one of the pair of insulative components of the stator; and
    a processor configured to:
    probe the first end and the second end to determine whether there is an electrical connection across the electrical conductor;

determine that there is no an electrical connection across the electrical conductor; and determine that there is rubbing on the motor component in response to determining that there is no electrical connection.

20. The system of claim 19, wherein the electrical conductor includes a first electrical conductor component and a second electrical conductor component, wherein the processor is further configured to:

use the first electrical conductor component and a second electrical conductor component across a planar surface of the motor component to detect a quantity of rubbing, the first electrical conductor component having a shorter height than the second electrical conductor component.

21. The system of claim 19, wherein the electrical conductor is a first electrical component disposed in a first region of the motor component, and the processor is further configured to:

probe a first end and a second end of a second electrical conductor provided in a second region of the stator to determine whether there is an electrical connection across the second electrical conductor;

determine that there is no electrical connection across the second electrical conductor based on probing; and determine that there is rubbing in the second region of the motor component in response to a determining that there is no electrical connection across the second electrical conductor.

22. The system of claim 19, wherein the electrical conductor is at least one of: flush with the surface of the stator, and embedded inside the stator.

\* \* \* \* \*